July 16, 1929.  J. L. SCOTT  1,721,418
SIGNALING SWITCH APPARATUS FOR AUTOMOBILES
Filed Jan. 15, 1927  2 Sheets-Sheet 1

J. Lindsay Scott
INVENTOR

By: Markes & Clerk
Attys.

July 16, 1929.　　　　J. L. SCOTT　　　　1,721,418
SIGNALING SWITCH APPARATUS FOR AUTOMOBILES
Filed Jan. 15, 1927　　　2 Sheets-Sheet 2
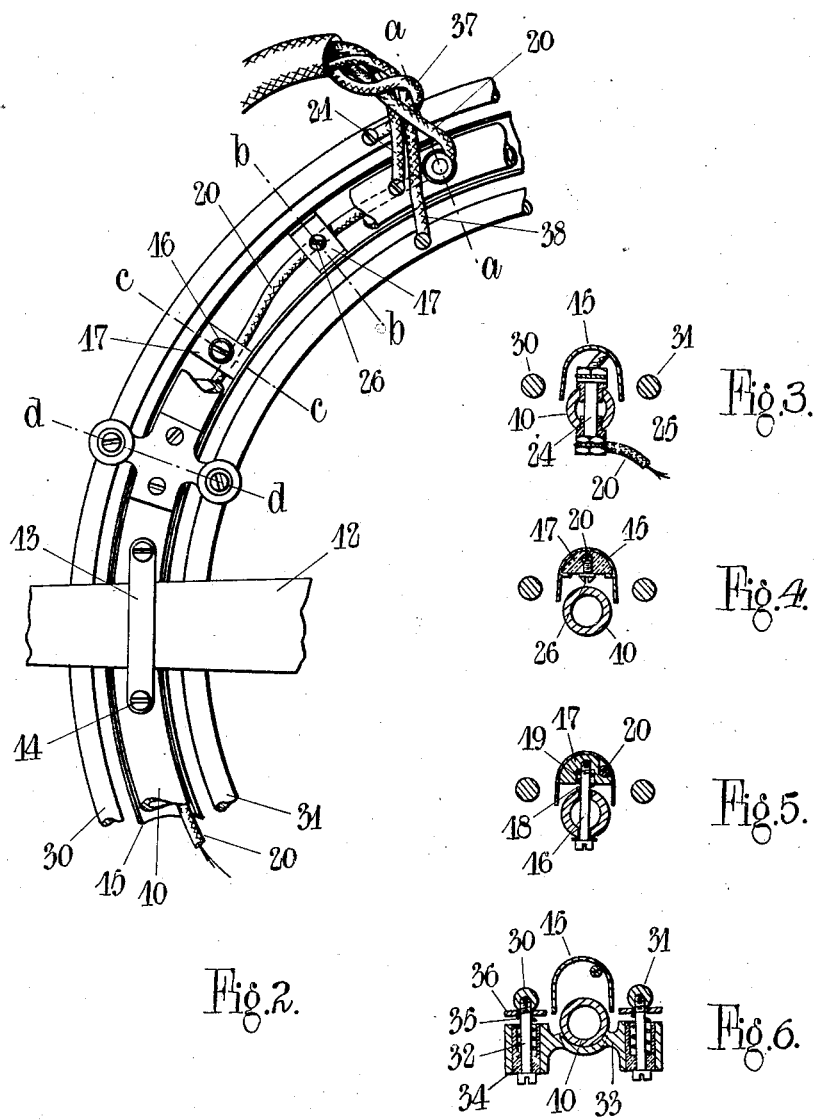
J. Lindsay Scott
INVENTOR
By: Marks & Clerk
Attys.

Patented July 16, 1929.

1,721,418

UNITED STATES PATENT OFFICE.

JOHN LINDSAY SCOTT, OF SOUTH KENSINGTON, LONDON, ENGLAND, ASSIGNOR OF ONE-HALF TO EURAL PATENTS LIMITED, OF LONDON, ENGLAND.

SIGNALING SWITCH APPARATUS FOR AUTOMOBILES.

Application filed January 15, 1927, Serial No. 161,368, and in Great Britain August 10, 1926.

This invention relates to signaling apparatus applicable for use on automobiles particularly to apparatus of that kind in which a movable ring supported on or concentric with the steering wheel of an automobile is adapted when moved to cause a warning to be given.

One object of the present invention is to provide improved means whereby a warning signal may be given to other traffic to indicate the direction in which a driver is about to turn the vehicle.

Another object of the invention is a self-contained appliance of this character that may be fitted to any steering wheel.

The invention consists in the provision in an automobile signaling device, of a switch for illuminating a pair of rear signals comprising an inner ring, an outer ring, a common circular intermediate support for both, a yoke piece attached to the intermediate support and arranged transversely thereof, a contact piece at each end of the yoke, means for yieldingly supporting the inner and outer rings so that they are normally spaced from the contact pieces of the yoke, and contact devices associated with each ring circuit so that when the inner or outer ring is depressed a circuit is completed.

Reference will now be made to the accompanying drawings, in which:—

Figure 2 is a reverse plan view of a portion of the operating rings on an enlarged scale that are mounted upon the steering wheel, and Figures 3 to 6 are cross sections of Figure 2 taken respectively on the lines a—a, b—b, c—c, and d—d.

Figure 1:
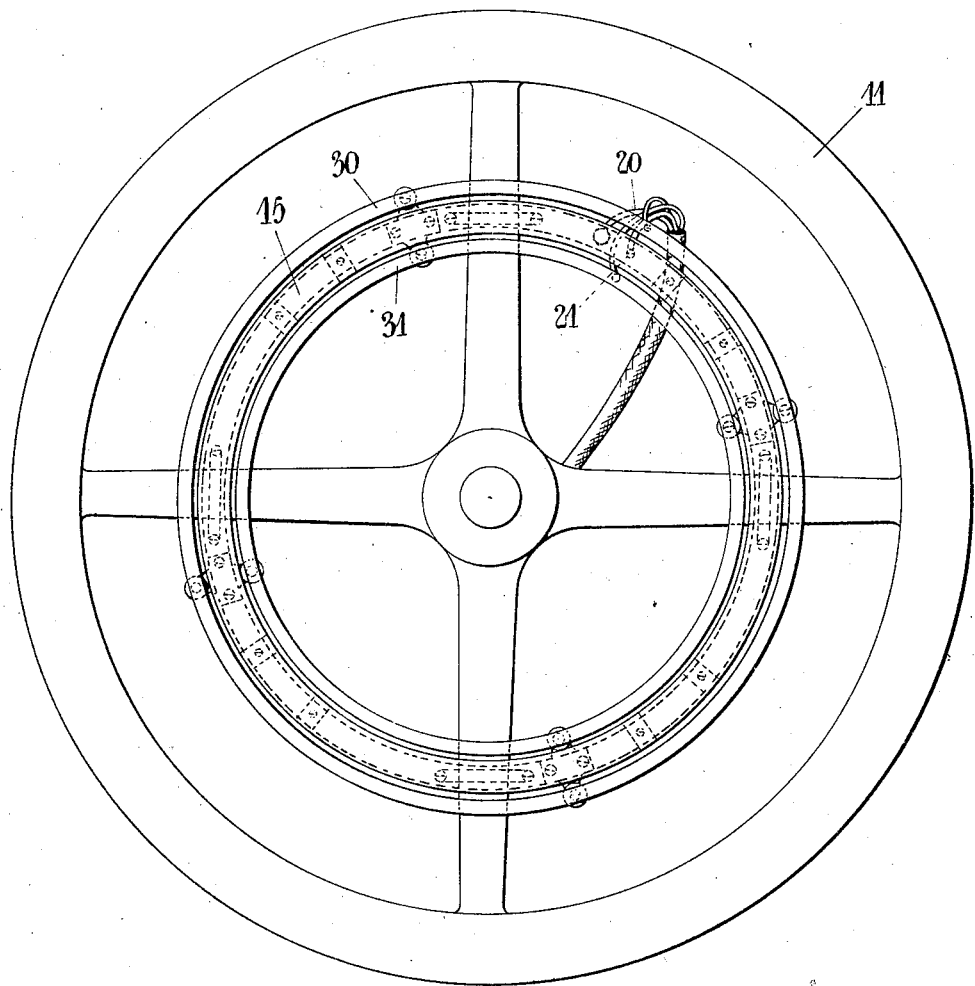
Figure 1 is a plan view of the steering wheel of the automobile.

For convenience the present invention will be described in connection with a wheel 10 mounted on and concentric with the usual steering wheel 11. The hollow ring 10 is adapted to be concentrically secured to two or more spokes of the steering wheel 11 (one being shown at 12 Figure 2) by means of clips 13 passing under a spoke and having each secured as by screws 14 to the ring 10 above the spoke.

Arranged above the ring 10 and spaced apart therefrom is an actuating ring or shell 15 of channel section, see Figures 3 to 6, and such shell is supported by a series of bolts 16 which as shown in Figure 5 each pass diametrically through the ring 10 and screw into an insulating or fixing block 17 which partly fills the hollow shell 15 and in order to keep the shell 15 and ring 10 apart a small helical spring 18 on the bolt 16 is arranged between the ring and the bottom of a socket 19 in the filler body 17. The shell 15 and ring 10 are electrically connected to a signal or the like and a source of supply by the leads 20, 21. The end of lead 21 is secured directly to the ring 10, but the lead 20 is secured to one end of a bolt 24 passing by means of insulating bushes 25 diametrically through a convenient part of the ring 10 and is continued round and within the shell 15, as shown in Figure 2, where it is supported by the filler blocks 17. Each block 17 receives a contact screw 26 the point of which is in electrical contact with the lead 20 whilst the head of such screw is normally spaced at a short distance from the upper part of the ring 10. It will be understood that when the driver of the automobile depresses the shell 15 and brings the heads of the screws 26 into contact with the ring 10 the electrical circuit is completed.

There are arranged concentrically and respectively inside and outside of the ring 10 on the steering wheel two other rings 30—31 which are supported at suitable intervals by bolts 32, see Figure 6, which pass through the ends of a yoke member 33 which is at its centre rigidly attached to the intermediate ring 10. Each bolt is contained in a recessed insulated bushing 34 and is encircled by a helical spring 35 which by means of a contact washer 36 at the upper end of the bolt presses the corresponding ring 30 or 31 upwards so that the washer 36 is kept spaced apart from the metal yoke 33. Suitable electric leads 37—38 are connected respectively to the inner and outer rings 30 and 31.

When therefore either of the rings 30 or 31 is depressed to make contact with the yoke 33 the corresponding circuit is completed.

While it is preferable for the contact devices on the steering wheel to assume the form of rings this is not absolutely necessary since they may be in the form of segments or levers with corresponding adaptations in the circuit leads.

It is to be noted that the above described indicating device need not be associated with a motor horn actuating arrangement. The combined form of these devices however presents a convenient combination of parts giving a unit construction that may be applied to any existing automobile steering wheel.

Having now described my invention, what I claim as new and desire to secure by Letters Patent is:—

1. In an automobile signaling device, the provision of a switch for illuminating a pair of rear signals comprising an inner ring, an outer ring, a common circular intermediate support for both, a yoke piece attached to the intermediate support and arranged transversely thereof, a contact piece at each end of the yoke, means for yieldingly supporting the inner and outer rings so that they are normally spaced from the contact pieces of the yoke and contact devices associated with each ring circuit so that when the inner or outer ring is depressed a circuit is completed.

2. In an automobile signaling device, the provision of a switch for illuminating a pair of rear signals comprising an inner ring, an outer ring, a common circular intermediate support for both, a yoke piece attached to the intermediate support and arranged transversely thereof, a socketed contact piece at each end of the yoke, a recessed insulating bush in said socket, a contact member carried on each inner and outer ring opposite each end of the yoke piece, a bolt passing centrally through each insulating bush and having one end rigidly secured to the inner and outer ring respectively, and a spring coiled around the bolt and abutting at its ends against the bottom of the recess in the insulating bush and the contact member carried on the inner and outer ring respectively so as to keep the contact member on the yoke normally spaced from its corresponding contact on the inner or outer ring.

In testimony whereof I have signed my name to this specification.

JOHN LINDSAY SCOTT.